(12) United States Patent
Wigren

(10) Patent No.: US 8,892,124 B2
(45) Date of Patent: Nov. 18, 2014

(54) METHOD AND DEVICES FOR POSITIONING INFORMATION REPORTING

(75) Inventor: Torbjörn Wigren, Uppsala (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 12 days.

(21) Appl. No.: 13/881,037

(22) PCT Filed: Nov. 5, 2010

(86) PCT No.: PCT/SE2010/051211
§ 371 (c)(1),
(2), (4) Date: Apr. 23, 2013

(87) PCT Pub. No.: WO2012/060753
PCT Pub. Date: May 10, 2012

(65) Prior Publication Data
US 2013/0210458 A1 Aug. 15, 2013

(51) Int. Cl.
*H04W 24/02* (2009.01)
*G01S 5/02* (2010.01)

(52) U.S. Cl.
CPC ............. *H04W 24/02* (2013.01); *G01S 5/0252* (2013.01); *G01S 5/0257* (2013.01)
USPC ..................................... 455/456.1; 455/456.5

(58) Field of Classification Search
USPC ...................... 455/404.2, 414.1–414.4, 422.1, 455/456.1–457
See application file for complete search history.

(56) References Cited

U.S. PATENT DOCUMENTS

2003/0087647 A1* 5/2003 Hurst ............................ 455/456
2005/0285783 A1 12/2005 Harper
2010/0317372 A1* 12/2010 Wigren et al. ............. 455/456.6
2010/0323723 A1* 12/2010 Gerstenberger et al. ... 455/456.5
2011/0244885 A1* 10/2011 Wigren ...................... 455/456.1

FOREIGN PATENT DOCUMENTS

| WO | 2007043915 A1 | 4/2007 |
| WO | 2008054271 A1 | 5/2008 |
| WO | 2008118052 A1 | 10/2008 |
| WO | 2010069614 A1 | 6/2010 |

OTHER PUBLICATIONS

Shi, L. et al. "AECID Fingerprinting Positioning Performance." IEEE Global Telecommunications Conference, 2009, Nov. 30-Dec. 4, 2009, pp. 1-6, Honolulu, USA.
Wigren, T. "Adaptive Enhanced Cell-ID Fingerprinting Localization by Clustering of Precise Position Measurements ." IEEE Transactions on Vehicular Technology, Sep. 2007, pp. 3199-3209, vol. 56, No. 5.
Wigren, T. et al. "RTT Positioning in WCDMA." Fifth International Conference on Wireless and Mobile Communications, 2009, Aug. 23-29, 2009, pp. 303-308, Cannes La Bocca, France.

* cited by examiner

*Primary Examiner* — Kashif Siddiqui
(74) *Attorney, Agent, or Firm* — Murphy, Bilak & Homiller, PLLC

(57) ABSTRACT

A method, performed in a positioning node of a wireless communication system, for positioning reporting in the wireless communication system comprises providing (210) of first positioning data of a first format in three dimensions. The first format represents a polygon with corner points. The corner points have coordinates in three dimensions. The first positioning data is transformed (220) into second positioning data of a second format. The second format represents the first positioning data as a representation of an elliptic cylinder that is centered around a center point and has an elliptic base in a base plane. The second positioning data is reported (230) over an interface of the wireless communication system.

17 Claims, 8 Drawing Sheets

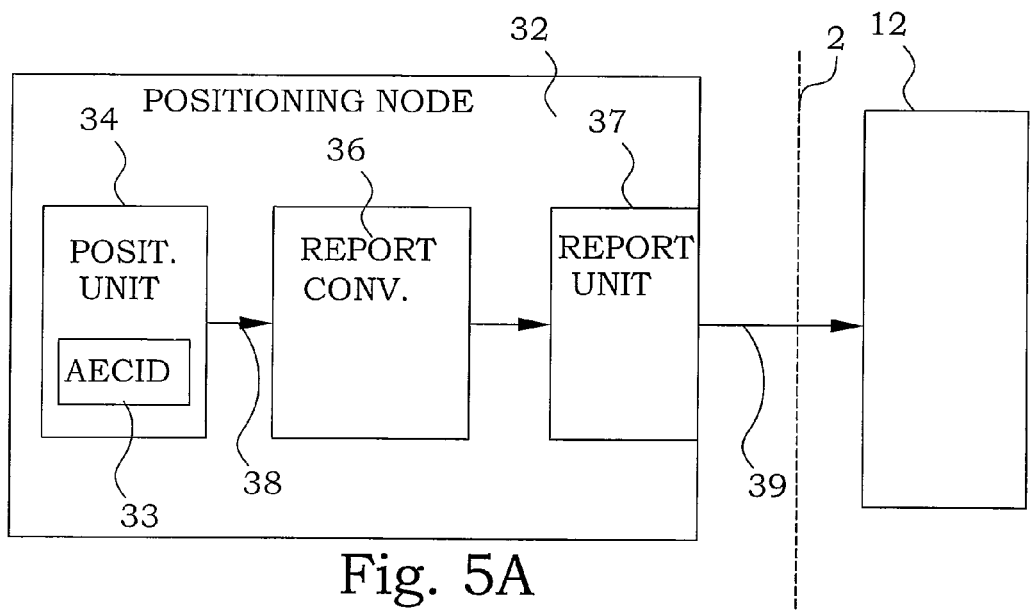

METHOD AND DEVICES FOR POSITIONING INFORMATION REPORTING

TECHNICAL FIELD

The present invention relates in general to reporting of positioning data in a wireless communication system and devices therefore.

BACKGROUND

Positioning possibilities within wireless communication networks play an important role in modern communication systems and will probably be even more exploited in future development. Many different kinds of information available in different nodes can be utilized for positioning purposes. In order to be able to perform position determinations, positioning information has to be communicated between different nodes in a communication system. The reporting procedures and formats for positioning information therefore also play an important role in the communication systems. In that respect, one also has to consider the compatibility with e.g. different standards for reporting.

A basic positioning method in most cellular communication systems is based on identification of a cell ID. A certain cell is associated with a certain area and if a mobile terminal is connected to the cell it can be assumed that the mobile terminal is situated within the associated area, or at least close to the associated area.

This concept has fairly recently been further developed into a method referred to as Adaptive Enhanced Cell-ID (AE-CID) fingerprinting. By associating high-precision position measurements with tags typically comprising different kinds of connection information as well as auxiliary quantized measurements, clusters of measurements having the same or similar tags will be gathered in certain limited areas. Such information can then be used in analogy with the cell-ID positioning to obtain a position estimation from such type of information that is comprised in the tags, without need of any high-precision positioning techniques. In other words, fingerprinting positioning uses detailed geographical maps of radio properties of the cellular system, to position the terminal. This fingerprinting technology is already today provided as a part of a serving mobile location center (SMLC) node functionality for Global System for Mobile communications (GSM). The fingerprinting functionality is also being migrated to LTE, where the positioning node typically is denoted the enhanced SMLC (eSMLC). This AECID fingerprinting is e.g. described in the published international patent application WO 2008/118052 A1 or in the article "Adaptive Enhanced Cell-ID Fingerprinting Localization by Clustering of Precise Position Measurements" by T. Wigren in IEEE Transactions on Vehicular Technology, Vol. 56, No. 5, September 2007, pp. 3199-3209. A further use of Round Trip Time (RTT) measurements is described in "RTT Positioning in WCDMA" by T. Wigren and J. Wennervirta in Proceedings of the 5th International Conference on Wireless and Mobile Communications, ICWMC 2009, Cannes/La Bocca, France, pp. 303-308, Aug. 23-29, 2009.

The result of the clustering of measurements in AECID is an area definition. The most convenient representation of such an area is a polygon, due to the fact that the shape of the area may vary very much. The polygon is adapted to enclose a predetermined fraction of the clustered measurement results within an as small area as possible. Such areas are also easily reported over e.g. Wideband Code Division Multiple Access (WCDMA) and Long-Term Evolution (LTE) networks by standard formats.

In most areas covered by cellular communication systems, the lateral position is the most important parameter. However, in e.g. urban areas or mountain areas, also the altitude parameter may be of importance. The AECID approach can be augmented to also handle the altitude parameter. To that end, one approach has been used based on that a plane polygon is adapted to the lateral parameters and a height for each polygon corner has been established based on the clustered position measurements in the vicinity of each polygon corner. The result is a polygon in three dimensions.

One problem with such a representation of positioning data is that there are today no standardized formats for reporting of three-dimensional polygons. In the published International patent application WO2008/054271, a two-dimensional polygon reporting format was utilized in a non-standardized manner to report three-dimensional polygon data. This approach operates well in most cases but is, as mentioned, not standard compatible. In the published International patent application WO2010/069614, the three-dimensional polygon was approximated by a point with an uncertainty ellipsoid. That approach operates very well in many situations, e.g. for most smaller cells.

However, the approaches disclosed in prior art are not perfect in all respects, and in particular since the LTE development and further future developments will change the availability of as well as the request for accurate positioning, there is a general need for improving the positioning report alternatives.

SUMMARY

An object of the present invention is to provide methods and devices for positioning reporting in a wireless communication system having improved adaptivity to present and future positioning methods.

The object is achieved by methods and arrangements according to the enclosed independent patent claims. Preferred embodiments are defined by the dependent claims. In general, a first aspect concerns a method, performed in a positioning node of a wireless communication system for positioning reporting in the wireless communication system. The method comprises providing of first positioning data of a first format in three dimensions. The first format represents a polygon with corner points. The corner points have coordinates in three dimensions. The first positioning data is transformed into second positioning data of a second format. The second format represents the first positioning data as a representation of an elliptic cylinder that is centered around a centre point and has an elliptic base in a base plane. The second positioning data is reported over an interface of the wireless communication system.

In a second aspect, a positioning node for use in a wireless communication system comprises an adaptive enhanced cell ID fingerprinting device, a report converter and a report unit. The report converter is connected to or incorporated into the adaptive enhanced cell ID fingerprinting device. The report converter is further configured for reception of first positioning data achieved by adaptive enhanced cell ID fingerprinting of a first format in three dimensions. The first format represents a polygon with corner points having coordinates in three dimensions. The report converter is further configured for transforming the first positioning data into second positioning data of a second format. The second format represents the first positioning data as a representation of an elliptic cylinder that is centered around a centre point and has an elliptic base in a base plane. The report unit is connected to the report converter. The report unit is configured for reporting the second positioning data over an interface of the wireless communication system.

One advantage with particular embodiments of the present invention is that they enable a more accurate positioning and in particular in situations where mobile terminals can be situated at very differing heights within a cell. Other advantages, and particular advantages for particular preferred embodiments, are further described in the detailed description here below.

BRIEF DESCRIPTION OF THE DRAWINGS

The invention, together with further objects and advantages thereof, may best be understood by making reference to the following description taken together with the accompanying drawings, in which:

FIG. 1 is an illustration of a 3GPP standardized format;

FIGS. 5A-B are schematic drawings of an embodiment of a positioning node;

DETAILED DESCRIPTION

Figure 2A:
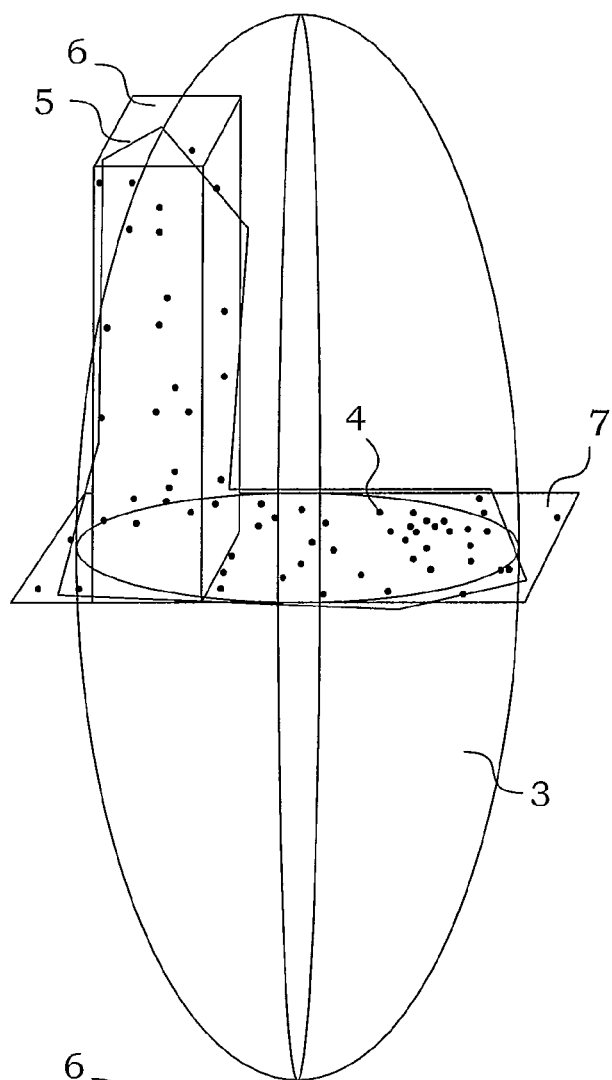
FIGS. 2A-B are schematic drawings of approximations of three-dimensional polygons with ellipsoids.

Throughout the drawings, the same reference numbers are used for similar or corresponding elements.

One part contributing to the present invention is the understanding of different implications in connection with the development of the LTE systems. Such implications will open up for more elaborate uses of positioning information as well as requiring extended reporting possibilities. Therefore, the present detailed description will start with discussions of positioning in the view of the LTE development.

First of all, it can be noted that the AECID functionality of LTE will be superior to that of GSM since the fingerprinting measurement possibilities in LTE generally are much better. In LTE, the fingerprinting measurements typically may include cell IDs (CIDs), timing advance (TA), received signal strengths (RSSs) as well as angle of arrivals (AoAs). Furthermore TA in LTE is much more accurate than corresponding techniques in GSM. Typically, is an accuracy of 100 m in the radial direction expected in LTE. Another advantage in LTE, is that there are more available high-precision measurements. The Assisted Global Positioning System (A-GPS) high precision positioning method is typically available, as in GSM. However, also the observed time difference of arrival (OT-DOA) method is typically available. This method complements A-GPS in particular indoors and provides complete coverage for AECID in LTE when OTDOA measurements of opportunity are used together with A-GPS measurements of opportunity for the radio map buildup.

The reasons why the AECID method is needed as a fallback method to A-GPS and OTDOA include the fact that A-GPS does not work indoors. Further OTDOA positioning is dependent on a good RBS geometry, however, such a deployment may not be economical in rural regions. OTDOA is therefore considered to be mainly an urban technology. Today, the majority of terminals also lack A-GPS support. Not even in the future can 100% A-GPS penetration be expected since roaming users will need to be accounted for in networks where A-GPS is mandatory in terminals.

Now, since A-GPS and OTDOA provide altitude information, there is a possibility to augment the polygons of the radio map of AECID with altitude information, added to each corner.

In existing technology for altitude augmentation, e.g. according to WO2010/069614, it is assumed that the altitude data has a uniform level of accuracy. The reason is that previously A-GPS has been considered to be the only source of information for the buildup of the AECID radio map, at least the only practical source to use. In LTE, however, this is no longer always the case. In LTE, also OTDOA may provide altitude data. The OTDOA altitude accuracy is, however, dependent on a good vertical distribution of the RBSs. In relatively hilly areas, where the altitude differences are large, the altitude accuracy will anyway be quite good, even if they generally are worse than altitudes obtained by e.g. A-GPS. However, in metropolitan areas with tall buildings and in mountainous regions, the vertical distribution of the RBSs becomes even more important. Since the RBSs primarily are distributed to achieve an as good coverage as possible, a good vertical distribution may not always be planned for. For the above reason it can be expected that OTDOA altitudes typically have a significantly larger uncertainty than A-GPS altitudes. This fact is not accounted for when the altitude of the corners of the AECID polygons are computed with prior art technology.

As discussed in prior art, a polygon with altitude added to the corners cannot be reported over the standardized interfaces of e.g. the LTE system. A polygon format is available, but does only permit corner positions in two dimensions. A special case of the latter conditions is that all points need to be different. In WO2010/069614, the three-dimensional polygon is transformed into a point with an ellipsoidal uncertainty to be able to use a standardized interface format.

The standardized format in 3rd Generation Partnership Project (3GPP) is referred to as "Ellipsoid Point with Altitude and Uncertainty Ellipsoid" format, where the "Ellipsoid Point" refers to a point in an ellipsoidal earth model. The format, i.e. the 3GPP Ellipsoid Point with Altitude and Uncertainty Ellipsoid message IE (Information Element) is illustrated in FIG. 1. Besides the pure geometrical information, the format also allows for a confidence measure.

The transformation of a polygon with corner points having an altitude into a point with an ellipsoid uncertainty according to prior art is based on an assumption that the users have a Gaussian probability distribution in altitude.

When performing the addition of altitude information, it was in prior art assumed that the normal use of the uncertainty ellipsoid is for reporting of A-GPS results. This means that it is normally assumed that the complete shape defines an underlying Gaussian error model. For this reason it was required to modify both the scaling of the computed 2D ellipse as well as the altitude uncertainty, to achieve a shape that was consistent with the Gaussian assumption of the prior art.

The starting point for the construction of the point with altitude and uncertainty ellipsoid in the prior art was to compute the ellipsoid point with altitude part. First, the centre point and the direction of the major axis of the uncertainty ellipse are determined from a two-dimensional projection of the polygon. The altitude of the centre point in the prior art is then computed as the mean of the altitudes of the polygon corners. To compute the prior art uncertainty ellipsoid, based on a Gaussian assumption, the 3D covariance matrix corresponding to the polygon with altitude was constructed. It is well known that the 2D principal axes of the covariance matrix correspond to the semi-major and semi-minor axes of the ellipse with a 38% (0.38) confidence. The covariance in the vertical direction is calculated and a scaling factor is applied to all axes of the covariance matrix in order to achieve the desired 3D confidence. For a full description, see e.g. WO 2010/069614.

Unfortunately the ellipsoid format has two drawbacks. First, the degrees of freedom in the 3GPP specification do not allow for a parameter that tilts the ellipsoid with respect to the vertical. This means that the vertical uncertainty needs to cover the vertical variation of the 3D polygon that would e.g. occur on a hillside. Secondly, the maximal vertical extension of the 3GPP ellipsoid occurs at the center point, rather than at the edges which would be better considering e.g. a hillside.

However, by analyzing possible scenarios where a single cell comprises very varying altitudes, it has been found that there exist many possible situations where the height distribution is far from Gaussian.

In a first example, consider a cell covering a tall building 6, see FIG. 2A. High-precision positioning measurements 4 are performed outside 7 the building as well as within the building 6. An AECID polygon 5 is created, having a generally flat extension except for the part where the building 6 is situated, where the corner altitude is significantly higher. If transforming such a polygon 5 into a point with an ellipsoid uncertainty 3, either the altitude uncertainty has to be very large or a large part of the building 6 will fall outside the defined uncertainty volume.

Figure 2B:
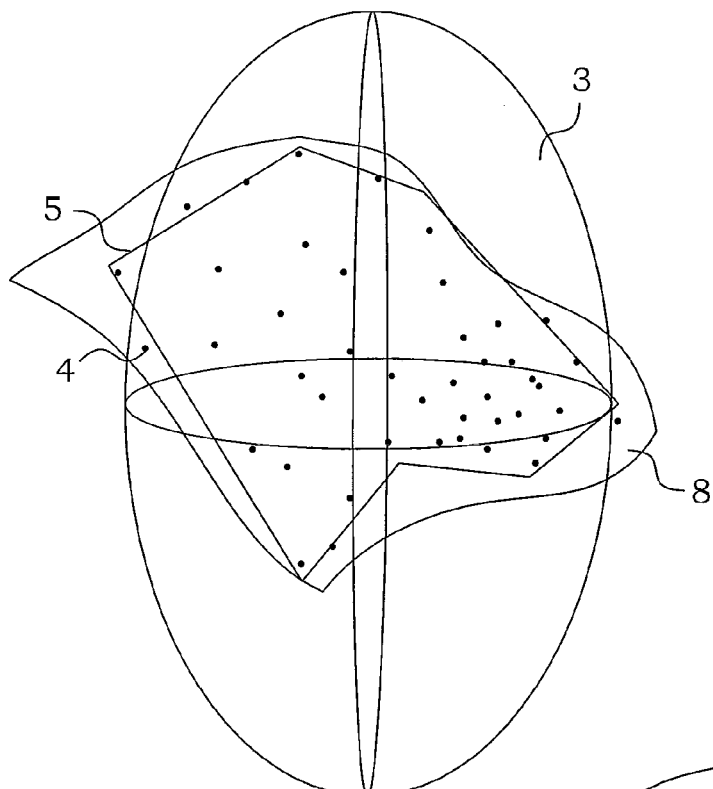

In a second example, consider a cell covering a slope 8 at a mountain, see FIG. 2B. High-precision positioning measurements 4 are performed spread over the mountain. An AECID polygon 5 is created, having vastly differing corner altitudes. If transforming such a polygon 5 into a point with an ellipsoid uncertainty 3, either the altitude uncertainty has to be very large or a large part of the highest and lowest slope 8 portions will fall outside the defined uncertainty volume.

As a summary of such scenarios, it is concluded that a Gaussian probability distribution in altitude may be unsuitable in many situations and it would instead be better to utilize an assumption of a uniform altitude distribution of the terminal location. A suitable format to cope with such situation would be an elliptic cylinder that is centered around a centre point and has an elliptic base in a base plane. The elliptic cylinder is preferably a right elliptic cylinder, i.e. the curved surface of the cylinder is perpendicular to the base plane.

Figure 3A:
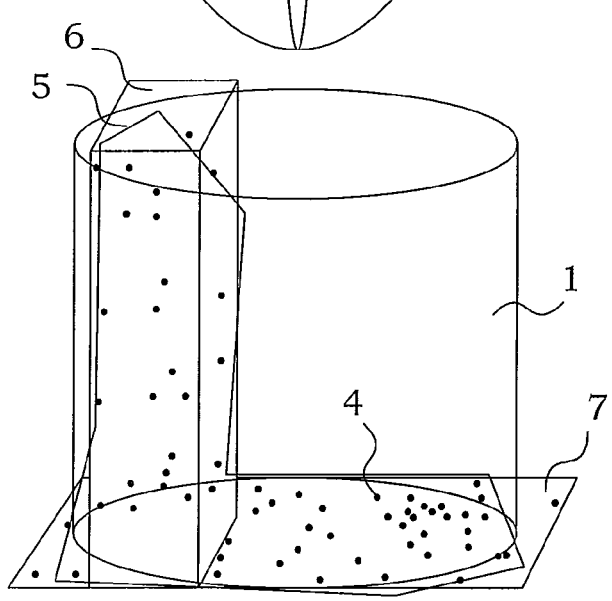
FIGS. 3A-B are schematic drawings of approximations of three-dimensional polygons with elliptic cylinders.
Figure 3B:
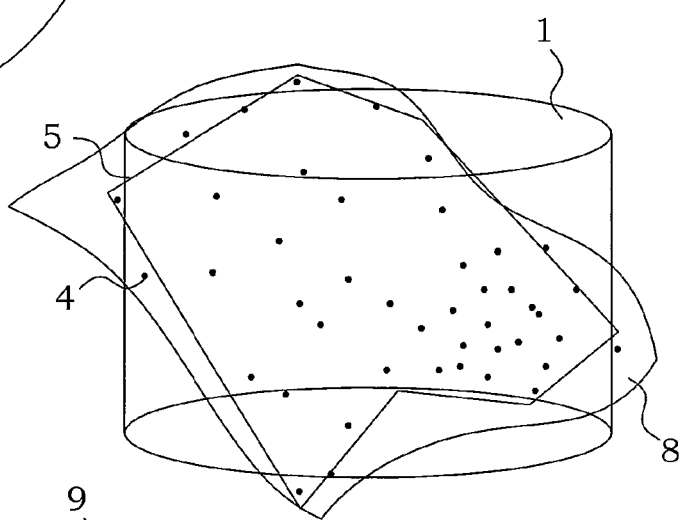

In FIG. 3A, an elliptic cylinder 1 is adapted to the three-dimensional polygon 5. In this case, the entire building 6 can be kept within the defined volume without defining any unnecessarily large altitude uncertainty. Similarly, as illustrated in FIG. 3B, an elliptical cylinder 1 is better suited to encompass the three-dimensional polygon 5 of the mountain slope 8.

However, such a uniform altitude distribution makes the transformation technically very different and with fundamentally different properties, compared to prior art transformations.

Figure 4:
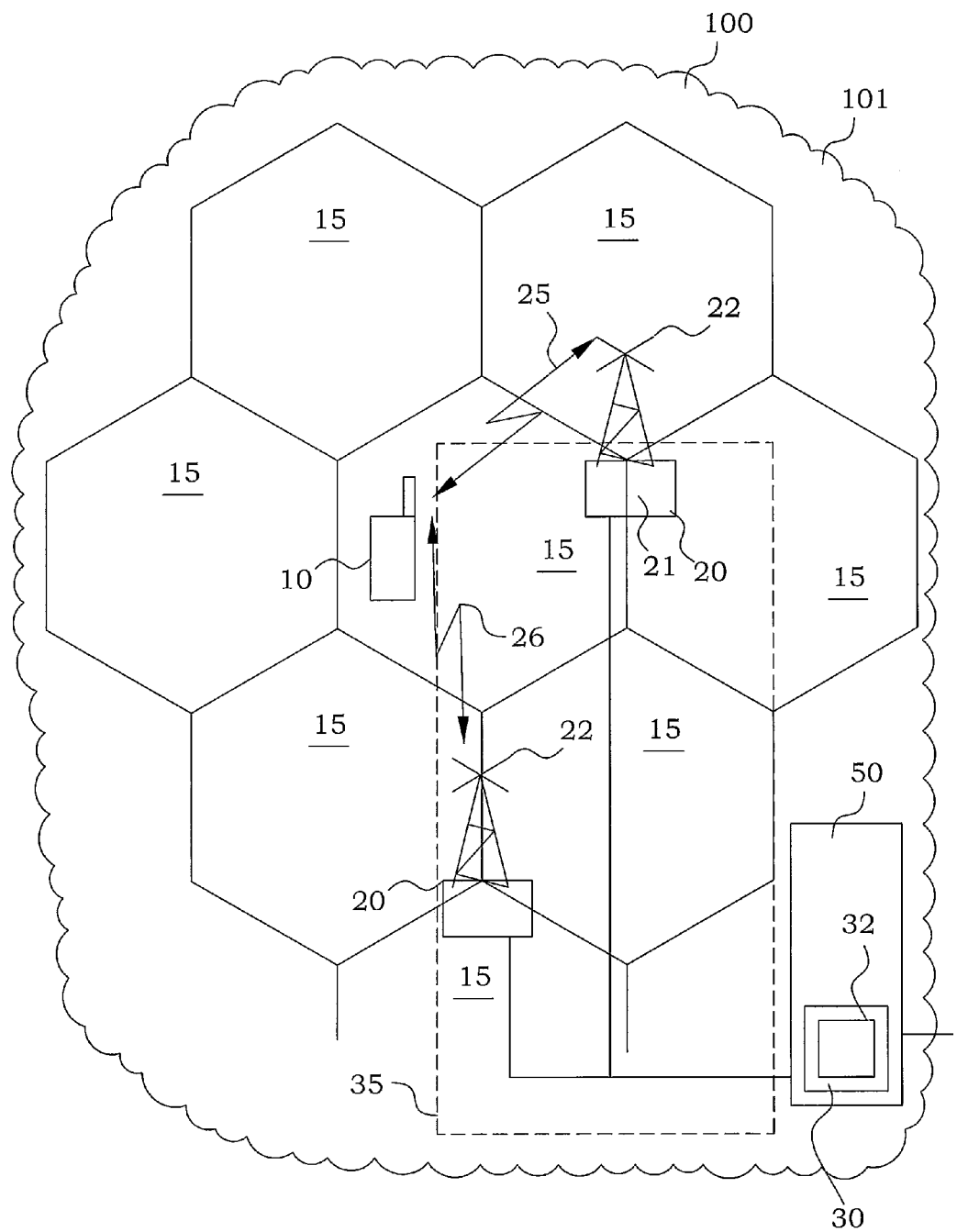
FIG. 4 is a schematic drawing of an embodiment of a cellular communication system.

FIG. 4 illustrates a wireless communication system 100, in this case a cellular communication system 101 configured according to LTE. Radio base stations (RBS) 20, in this embodiment extended node B's (eNB) 21, are spread over the coverage area of the wireless communication system 100 and serves antennas 22 which in this particular embodiment are sectorized antennas 22. A cell 15 is associated with each sector of the antennas 22, as the area in which connection to the communications system preferably is performed through that particular sector. The situation in FIG. 4 is idealized illustrating the cells as regular hexagons. In practice, the cell borders are typically complex shaped. The eNB's 21 comprise functionality that in earlier systems were associated with radio network controllers. A user equipment (UE) 10 and the eNB's 21 are nodes comprised in the Evolved Universal Terrestrial Radio Access Network (E-UTRAN) 35. The eNB's 21 are further connected to a Core Network (CN) 50 of the wireless communication system 100. The CN 50 comprises typically an Enhanced Serving Mobile Location Center (eSMLC) 30 which comprises functionalities associated to location procedures. The eSMLC 30 may in a typical case comprise a positioning node 32. Any other node in the CN 50 as well as nodes in the E-UTRAN 35 may thereby communicate with the eSMLC 30, e.g. for receiving positioning data.

FIG. 4 is intended to illustrate an LTE system, in which the present invention may be applied. However, also other systems such as WCDMA or even GSM are possible to implement embodiments of the present invention in. In WCDMA, the positioning node is typically comprised in the radio network controller. In GSM, the positioning node is typically comprised in the serving mobile location center (SMLC) node.

FIG. 5A is a schematic illustration of an embodiment of a positioning node 32. The positioning node 32 is intended for use in a wireless communication system, such as a system based on e.g. WCDMA or LTE. The positioning node 32 comprises a positioning unit 34, which is configured to provide positioning data. In this embodiment, the positioning unit 34 comprises an adaptive enhanced cell ID fingerprinting device 33. The adaptive enhanced cell ID fingerprinting device 33 provides positioning data 38 according to principles described further below. The positioning data 38 is data represented in three dimensions. The positioning data 38 is provided in a format, which represents a polygon with corner points having coordinates in three dimensions.

A report converter 36 is connected to the adaptive enhanced cell ID fingerprinting device 33 for reception of the positioning data achieved by adaptive enhanced cell ID fingerprinting of a first format in three dimensions. In an alternative embodiment, the report converter 36 may be partly or entirely incorporated into the adaptive enhanced cell ID fingerprinting device 33 or positioning unit 34. The report converter is configured for transforming the positioning data of the first format into second positioning data of a second format. The second format represents the first positioning data, but as a representation of an elliptic cylinder. The elliptic cylinder is centered around a centre point and the elliptic cylinder has an elliptic base in a base plane. Preferably the elliptic cylinder is a right elliptic cylinder.

A report unit 37 is connected to the report converter 36 and is configured for reporting the second positioning data over an interface 2 of the wireless communication system. The interface 2 is typically a standardized interface according to any wireless communication standard, e.g. according to the 3GPP specifications of LTE. At a receiving side, at a second node 12, the positioning data can be utilized for various purposes. No re-conversion is made. Instead, the position expressed as a 3D region is assumed to be defined by the second format.

Figure 5B:
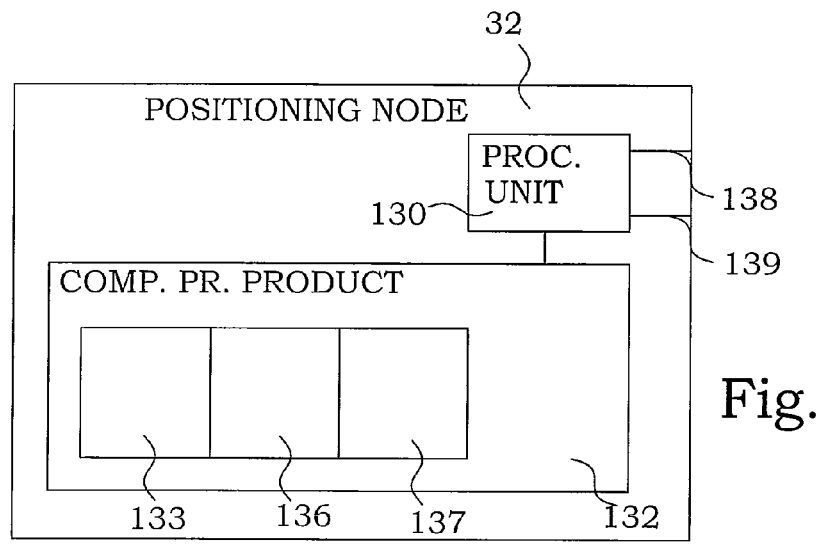

FIG. 5B is an alternative way of disclosing an embodiment of the positioning node 32. Comprised in the positioning node 32 is a processing unit 130, typically a Digital Signal Processor with necessary encoding/decoding modules. The processing unit 130 can be a single unit or a plurality of units to perform different steps of procedures described herein. The positioning node 32 also comprises an input 138 and an output 139 for receiving and transmitting signals from and to external units. The input 138 and output 139 can also be designed as a common port. The positioning node 32 comprises at least one computer program product 132 in the form of a non-volatile memory, e.g. an EEPROM, a flash memory and a disk drive. The computer program product 132 comprises a computer program comprising code means which run on the processing unit 130 cause the positioning node 32 to perform the steps of the procedures described further below. Here in the exemplary embodiment of FIG. 5B, the code means in the computer program comprises an AECID module 133, a report conversion module 136 and a report module 137. The modules 133, 136, 137 essentially perform the steps of the procedures described further below. In other words, when the different modules 133, 136, 137 are run on the processing unit 130 they correspond to the corresponding units 33, 36 and 37 of FIG. 5A.

Although the code means in the embodiment disclosed above in conjunction with FIG. 5B are implemented as computer program modules which when run on the processing unit causes the positioning node 32 to perform steps of the procedures described further below, at least one of the code means may in alternative embodiments be implemented at least partly as hardware circuits.

The positioning node 32 is typically situated in the Radio Network Controller (RNC) in WCDMA, eSMLC in LTE, SMLC in GSM, while the receiving node typically is a core network node. However, there are also other possibilities.

The present invention is particularly suitable for handling position data obtained by adaptive enhanced cell ID (AECID) fingerprinting, i.e. where the first format represents AECID positioning data. Therefore, a short introduction into the AECID is given.

A typical AECID procedure starts with data collection. Whenever an A-GPS or OTDOA measurement is performed, the AECID radio mapping functionality may be applied. The A-GPS or OTDOA position, in particular in LTE with altitude information, is registered. At the same time, or very closely in time, the radio fingerprint is determined from other LTE radio measurements and data retrieval functions. The fingerprint consists typically of a subset of at least the serving CID, the neighbor CIDs, the TA of the serving cell, the RSSs of neighbor cells and AoA measurements. The measurements are quantized in order to avoid too much overlap of the polygons that are computed later and to obtain a reasonable fast population of the radio map database. The A-GPS or OTDOA measurement, tagged with the radio fingerprint is denoted a fingerprinted high precision reference position.

Following the data collection set, all high precision position measurements, with the same fingerprint are stored in separate clusters. It can be noted that at this stage it is common to store the position in the so called WGS84 format that is used by 3GPP.

A polygon is initialized, which encloses the entire cluster, projected to lateral dimension by exclusion of the altitude information. A contraction point is selected and a procedure to shrink the polygon towards the contraction point is performed. The goal is to achieve a polygon enclosing a predetermined fraction of the clustered positions that has an as small area as possible. The predetermined fraction ensures that the experimental confidence has reached the desired level.

More details about such procedures are found in e.g. WO 2008/118052 A1 or in the article "Adaptive Enhanced Cell-ID Fingerprinting Localization by Clustering of Precise Position Measurements" by T. Wigren in IEEE Transactions on Vehicular Technology, Vol. 56, No. 5, September 2007, pp. 3199-3209.

As mentioned further above, the present invention can also be utilized together with any other positioning methods presenting their result as a polygon with heights.

Figure 6:
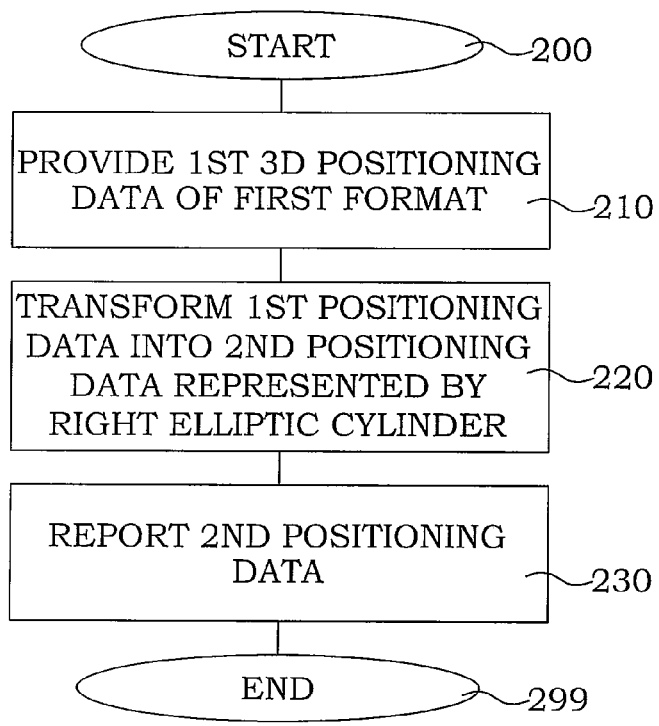
FIG. 6 is a flow diagram of an embodiment of a method for positioning reporting.

FIG. 6 illustrates a flow diagram of steps of an embodiment of a method for positioning reporting in a wireless communication system. The method is performed in a positioning node of a wireless communication system. The method for positioning reporting starts in step 200. In step 210, first positioning data of a first format in three dimensions is provided. The first format represents a polygon with corner points. The corner points have coordinates in three dimensions. As mentioned above, in a particular embodiment, the polygon with corner points can be the result of an AECID procedure. The first positioning data is transformed in step 220 into second positioning data of a second format. The second format represents the first positioning data as a representation of an elliptic cylinder. The elliptic cylinder is centered around a centre point and has an elliptic base in a base plane. In step 230, the second positioning data is reported over an interface of the wireless communication system. The procedure ends in step 299.

The procedure results in a position information format that generally represents typical three-dimensional data in a more appropriate manner than prior art alternatives. In other words, the method exploits a 3-dimensional (3D) uniform distribution for the (prior) terminal location. In particular embodiments a new shape conversion is adapted to fingerprinting positioning. This possibility becomes particularly advantageous in suburban and rural regions.

The transformation of the polygon format in to the elliptic cylinder format can in general be performed according to any conventional optimization algorithm. A relatively small number of parameters have to be adapted in order to achieve an as small elliptic cylinder volume as possible and still resemble the original polygon shape in some manner. Such a transformation may be performed directly in the three-dimensional space. However, in one embodiment, the elliptic cylinder base is adapted to the lateral coordinates of the polygon corners and the cylinder height is thereafter added taking the altitude coordinate of the polygon corners into account.

Figure 7:
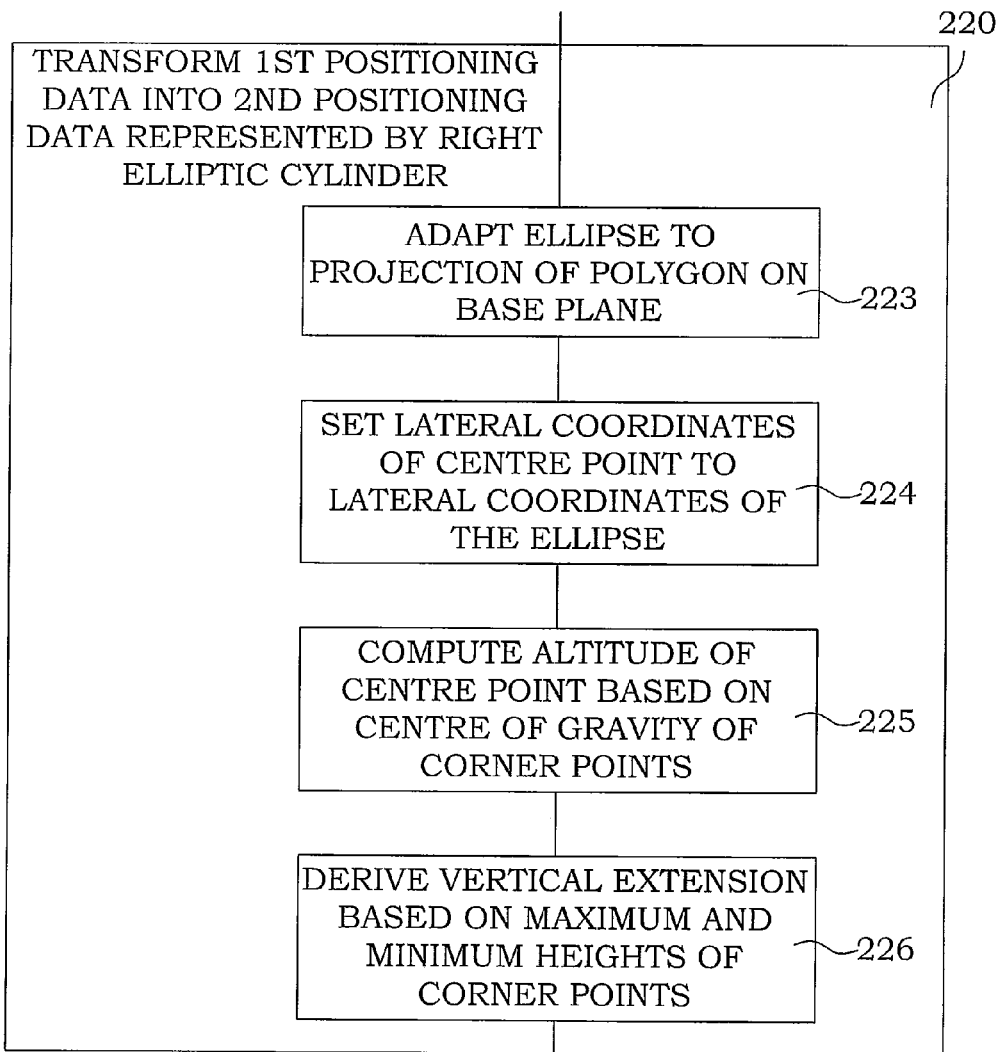
FIG. 7 is a flow diagram of an embodiment of a transforming step of a method for positioning reporting.

Such an approach is illustrated in FIG. 7. Here an embodiment of step 220 from FIG. 6, i.e. an embodiment of the step of transforming first positioning data into second positioning data represented by right elliptic cylinder, is presented in more detail. In step 223, centre lateral coordinates and major axis, minor axis and orientation of an ellipse are adapted to a projection of the polygon to the base plane defining the elliptic base. In a basic version, where the base plane of the elliptic cylinder is horizontal, such a projection simply corresponds to an extraction of the lateral coordinates. As is described more in detail further below, this projection can also be different.

In step 224, lateral coordinates, with respect to the base plane, of the centre point are set to be equal to the centre lateral coordinates, with respect to the base plane, of the elliptic base. In other words, the elliptic cylinder is centered around the obtained centre lateral coordinates of the two-dimensional ellipse. Also the major axis, the minor axis and the orientation of the ellipse becomes major axis, the minor axis and the orientation of the base of the elliptic cylinder. The ellipse is thus the ellipse that spans the elliptic cylinder. An altitude of the centre point along a normal to the base plane is computed in step 225, based on centre of gravity properties of the corner points. This altitude thus represents the altitude associated with the centre point in the lateral direction, if the base plane is horizontal. In step 226, a vertical extension of the elliptic cylinder on each side of the centre point along the normal to the base plane is derived, based on maximum and minimum heights of the corner points relative to the base plane.

Figure 8:
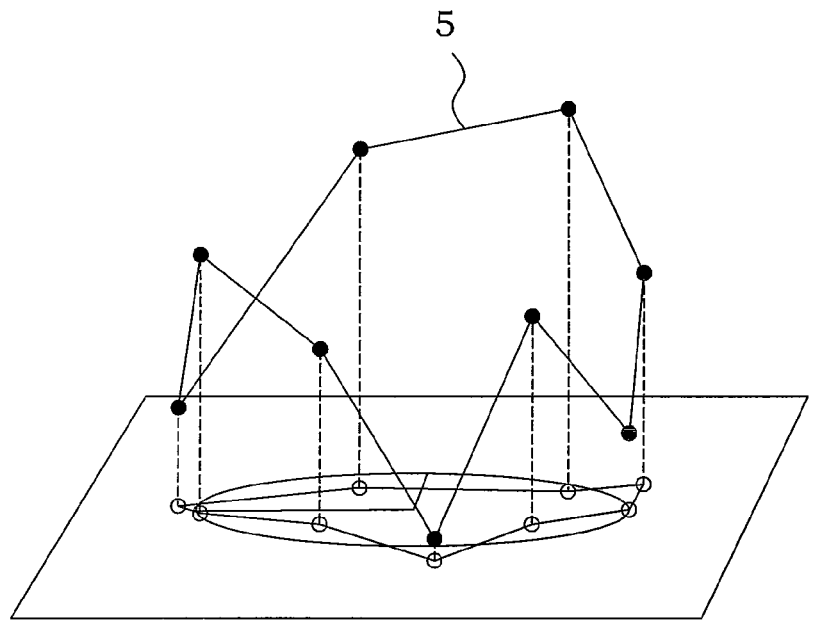
FIG. 8 is a schematic drawing illustrating an adaptation of an ellipse to a projection of a polygon.

This can schematically be illustrated by FIG. 8. A polygon 5 with altitude is illustrated with filled circles at its corners. The polygon 5 is projected onto the base plane, in this case the horizontal plane giving rise to a two-dimensional polygon, illustrated with unfilled circles at its corners. An ellipse is adapted to the two-dimensional polygon at the base plane and the lateral position, the shape and orientation is accepted as defining the shape and position of the curved surface of the final cylinder. Finally, the altitude of the centre point and the height of the cylinder are found by using the altitudes of the corners of the original polygon.

The ellipse is parameterized with semi-major axis a, semi-minor axis b and an angle $\phi$ relative to north, counted clockwise from the semi-major axis.

Figure 9:
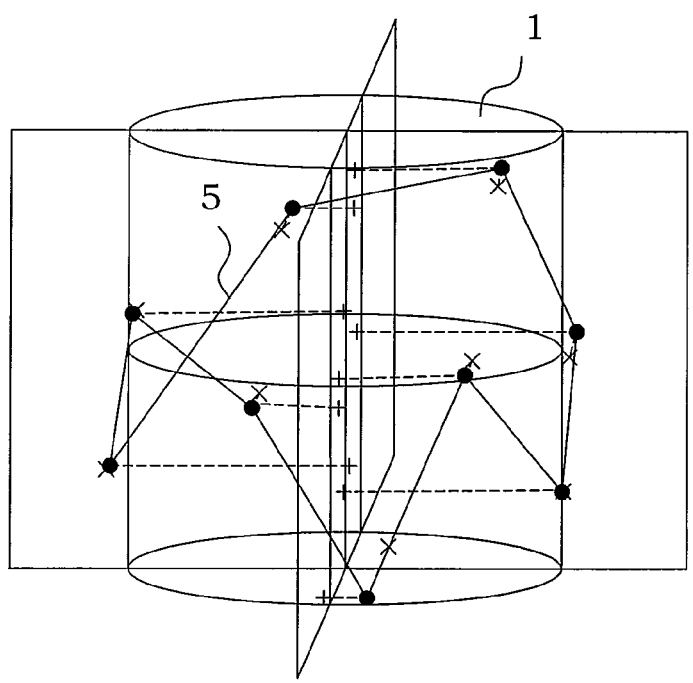
FIG. 9 is a schematic drawing illustrating computation of an altitude of a centre point.

In one advantageous embodiment, the computing of the position of the centre point is performed by determining two two-dimensional center of gravities of the polygon corners in respective perpendicular planes being parallel to the direction of the normal of the base plane, and by setting the position of the centre point along the normal to the base plane as an average of the two two-dimensional centers of gravity. This is schematically illustrated in FIG. 9, where crosses illustrate projections to one plane and plus signs illustrate projections to a perpendicular plane. The respective centers of gravity on these two planes are then averaged to obtain a value of the position of the centre point.

In another advantageous embodiment, the computing of the position of the centre point is performed by determining an altitude along the normal to the base plane of a three-dimensional center of gravity of the polygon corners. This embodiment may give a somewhat more correct result, but requires more computational power.

One particular embodiment for finding the height of the cylinder uses the difference between the highest and lowest altitudes. More particularly, the deriving of a vertical extension of the elliptic cylinder on each side of the centre point along the normal to the base plane comprises computation of half the difference between the maximum and minimum heights of the corner points relative to the base plane times a factor representing a confidence value of the position in three dimensions.

The above presented embodiments thus introduce a new shape or format conversion, from polygon with altitude, to a point with uncertainty elliptic cylinder. The details of this shape transformation are technically completely different from e.g. the one used for finding a point and uncertainty ellipsoid, at least concerning the altitude dimension.

The format conversion can also be expressed in mathematical terms. First the transformation of the two-dimensional polygon to a two-dimensional ellipse is discussed. The ellipse is parameterized with semi-major axis a, semi-minor axis b and an angle $\phi$ relative to north, counted clockwise from the semi-major axis. The computation of the polygon area is performed by integration between adjacent corners of the polygon, collected in:

$$r^{p,2D} = (r_1^{p,2D} \ldots r_{N_p}^{p,2D}), \qquad (1)$$

where $N_p$ is the number of corners. The area $A^{p,2D}$ is then given by the standard result:

$$A^{p,2D} = \frac{1}{2} \sum_{i=1}^{NP-1} (x_i^p y_{i+1}^p - x_{i+1}^p y_i^p) + \frac{1}{2}(x_{NP}^p y_1^p - x_1^p y_{NP}^p) \qquad (2)$$

Standard results, again based on integration, gives the center of gravity:

$$r_{CG,polygon}^{p,2D} = (x_{CG,polygon}^p \quad y_{CG,polygon}^p)^T \qquad (3)$$

$$x_{CG,polygon}^p = \frac{1}{6A^{p,2D}} \left( \sum_{i=1}^{NP-1} (x_i^p + x_{i+1}^p)(x_i^p y_{i+1}^p - x_{i+1}^p y_i^p) + (x_{NP}^p + x_1^p)(x_{NP}^p y_1^p - x_1^p y_{NP}^p) \right)$$

$$y_{CG,polygon}^p = \frac{1}{6A^{p,2D}} \left( \sum_{i=1}^{NP-1} (y_i^p + y_{i+1}^p)(x_i^p y_{i+1}^p - x_{i+1}^p y_i^p) + (y_{NP}^p + y_1^p)(x_{NP}^p y_1^p - x_1^p y_{NP}^p) \right) \qquad (4)$$

To find the polygon orientation of the ellipsoid, $\pi/2-\phi$, a search over lines that pass through the center of gravity of the 2D polygon is performed, to find the line with the longest line segment with end points on the boundary of the polygon:

Selection of test angles in $[-\pi/2, \pi/2]$.
For each of the lines passing through $r_{CG,polygon}^{p,2D}$:
  Determination of all intersections between the line through $r_{CG,polygon}^{p,2D}$ and the line segments forming the polygon boundary.
  Determination of the longest line segment, defined by the line which passes through $r_{CG,polygon}^{p,2D}$ and the intersections.
Selection of $\pi/2-\phi$ as the angle generating the line segment that is longest, for all angles.

To formulate the algorithmic steps, $r_i^{p,2D}$ and $r_j^{p,2D}$ are used to denote two adjacent corners of the polygon. The point $r^{p,2D}$ on the boundary of the polygon fulfills:

$$r = r_{CG,polygon}^{p,2D} + \gamma \begin{pmatrix} \cos(\pi/2 - \varphi) \\ \sin(\pi/2 - \varphi) \end{pmatrix} \qquad (5)$$

$$r = r_i^{p,2D} + \delta(r_j^{p,2D} - r_i^{p,2D}), \qquad (6)$$

and where $\gamma$ and $\delta$ are scalar parameters. The solution to the system of equations defined by (5) and (6) follows as:

$$\begin{pmatrix} \gamma \\ \delta \end{pmatrix} = \begin{pmatrix} \cos(\pi/2 - \varphi) & x_i^p - x_j^p \\ \sin(\pi/2 - \varphi) & y_i^p - y_j^p \end{pmatrix}^{-1} \begin{pmatrix} x_i^p - x_{CG,polygon}^p \\ y_i^p - y_{CG,polygon}^p \end{pmatrix}. \qquad (7)$$

For a given $\phi$, and pair of corner points ($r_i^p$ and $r_j^p$), the parameters $\gamma$ and $\delta$ are determined. In case $\delta \in [0,1]$, the intersection falls between the corner points and is valid. The calculation of $\gamma$ and $\delta$ are repeated for all line segments of the polygon. Since the direction vector of the line through the center of gravity is normalized, the length of the line segment between the center of gravity and the boundary is given by γ. The intersections k (maximum length) and l (minimum length, other direction) which generate the largest difference:

$$l(\pi/2-\phi) = \gamma_k - \gamma_l, \tag{8}$$

correspond to the sought candidate length for the angle $\pi/2-\phi$. Finally, the angle $\pi/2-\phi$, that renders the largest value of $l(\pi/2-\phi)$ is determined, where the subscript e refers to the ellipse, i.e., $$\pi/2 - \varphi_e = \underset{\varphi}{\mathrm{argmax}}\, l(\pi/2 - \varphi). \tag{9}$$

To calculate the ellipse axes the polygon corners are translated so that the center of gravity of the polygon is moved to the origin. The corners are then rotated so that the orientation coincides with the x-axis:

$$r^{p,2D'} = r^{p,2D} - r^{p,2D}_{CG,polygon} \tag{10}$$

$$r^{p,2D''} = \begin{pmatrix} \cos(\pi/2-\varphi_e) & \sin(\pi/2-\varphi_e) \\ -\sin(\pi/2-\varphi_e) & \cos(\pi/2-\varphi_e) \end{pmatrix} r^{p,2D'}. \tag{11}$$

Here $r^{p,2D'}$ and $r^{p,2D''}$ denote translated and rotated polygon coordinates, respectively.

To calculate the semi-major and semi-minor axes, the confidence of the 2D polygon, $C^{p,2D}$, and the required reporting confidence, $C_e^{p,2D}$, are used. Since the distribution of users is assumed to be uniform over the polygon and the ellipse, the following constraint holds for the areas of the polygon, $A^{p,2D}$, and the ellipse, $A_e^{p,2D}$ $$A_e^{p,2D} = \frac{C_e^{p,2D}}{C^{p,2D}} A^{p,2D}. \tag{12}$$

Using that the area of an ellipse is $\pi ab$, where a and b denote the semi-major and semi-minor axis, it follows that $$ab = \frac{1}{\pi} \frac{C_e^{p,2D}}{C^{p,2D}} A^{p,2D}. \tag{13}$$

The algorithm now determines the semi-minor axis that provides the best fit according to the criterion $$V(b) = \frac{1}{NP} \sum_{i=1}^{NP} \left( (y_i^{p''})^2 - (y_e(b, x_i^{p''}))^2 \right)^2 \tag{14}$$

Note that the square of the y-coordinates of the polygon and the ellipse model is used in the criterion. This avoids the need for separate treatment of the branches of the ellipse curve. The ellipse model $$(y_e(b, x_i^{p''}))^2$$

follows from $$\frac{x_e^2}{a^2} + \frac{y_e^2}{b^2} = 1. \tag{15}$$

When back-substituted in (14), the optimization problem is $$b_e = \left( \underset{b^2}{\mathrm{argmin}} \frac{1}{NP} \sum_{i=1}^{NP} \left( (y_i^{p''})^2 - (b^2)^2 \frac{\pi^2 (C^{p,2D})^2}{(C_e^{p,2D})^2 (A^{p,2D})^2} (x_i^{p''})^2 \right)^2 \right)^{\frac{1}{2}} \tag{16}$$

after elimination of a using (13). A differentiation of the sum of squares, with respect to $b^2$, renders the following cubic equation for $b_e^2$ from which $b_e^2$ can be solved $$\varepsilon_0 + \varepsilon_1 b_e^2 + \varepsilon_2 (b_e^2)^2 + \varepsilon_3 (b_e^2)^3 = 0 \tag{17}$$

$$\varepsilon_0 = -\sum_{i=1}^{NP} (y_i^{p''})^2 \tag{18}$$

$$\varepsilon_1 = \sum_{i=1}^{NP} \left( 1 + 2 \frac{\pi^2 (C^{p,2D})^2}{(C_e^{p,2D})^2 (A^{p,2D})^2} (x_i^{p''})^2 (y_i^{p''})^2 \right) \tag{19}$$

$$\varepsilon_2 = -\sum_{i=1}^{NP} 3 \frac{\pi^2 (C^{p,2})^2}{(C_e^{p,2D})^2 (A^{p,2D})^2} (x_i^{p''})^2 \tag{20}$$

$$\varepsilon_3 = \sum_{i=1}^{NP} 2 \frac{\pi^4 (C^{p,2D})^4}{(C_e^{p,2D})^4 (A^{p,2D})^4} (x_i^p)^4. \tag{21}$$

To optimize the numerical results, it is recommended that a scaling with the polygon radius of all quantities of is performed. The cubic equation can be solved numerically, or analytically using the techniques of Thomas Harriot. With $b_e$ determined, $a_e$ follows from (13).

The confidence is defined as the probability that the terminal is located in the interior of the reported region. The AECID fingerprinting positioning error is caused by radio propagation effects. Hence it is natural to adopt a uniform statistical model for the terminal location. The ellipse that is derived from the 3D polygon will also be associated with a uniform distribution. This difference makes the transformation fundamentally different to the shape conversions of prior art.

The 2D confidence, $C^{p,2D}$, of the AECID polygon is given by the polygon contraction algorithm. When calculating the semi-minor and semi-major axes of the 2D ellipse, the 2D required confidence is needed. However the required confidence, $C_{ellipsoid}^{p,3D}$, is here given as a 3D quantity. To relate the confidence of the polygon to the 2D confidence of the ellipse, a new computation of this quantity is needed.

Assuming independence between coordinates, it holds that:

$$C_{ellipsoid}^{p,3D} = \left(C_{ellipsoid}^{p,3D}\right)^{\frac{1}{3}} \left(C_{ellipsoid}^{p,3D}\right)^{\frac{1}{3}} \left(C_{ellipsoid}^{p,3D}\right)^{\frac{1}{3}} = \\ \left(C_{ellipsoid}^{p,3D}\right)^{\frac{2}{3}} \left(C_{ellipsoid}^{p,3D}\right)^{\frac{1}{3}} \equiv C_e^{p,2D} C_{altitude}^{p,1D}, \tag{22}$$

where $C_e^{p,2D}$ is the required 2D confidence of the ellipse generating the ellipsoid. The calculation of the 2D ellipse can then proceed as described above.

The final step is to add the altitude of the center point and the extension of the vertical axis to the cylinder. The centre point altitude is preferably near the vertical centre of gravity of the 3D polygon. The exact computation of the vertical center of gravity of the 3D polygon would require integration over the surface. In an alternative embodiment as mentioned above, the 2D center of gravity calculation is exploited, applied to z and y, and to z and y, rather than to x and y. The two results are then averaged as:

$$A^{p,zx} = \frac{1}{2}\sum_{i=1}^{NP-1}(z_i^p x_{i+1}^p - z_{i+1}^p x_i^p) + \frac{1}{2}(z_{NP}^p x_1^p - z_1^p x_{NP}^p), \quad (23)$$

$$z_{CG}^{p,zx} = \frac{1}{6A^{p,zx}} \left(\sum_{i=1}^{NP-1}(z_i^p + z_{i+1}^p)(z_i^p x_{i+1}^p - z_{i+1}^p x_i^p) + (z_{NP}^p + z_1^p)(z_{NP}^p x_1^p - z_1^p x_{NP}^p)\right), \quad (24)$$

$$A^{p,zy} = \frac{1}{2}\sum_{i=1}^{NP-1}(z_i^p y_{i+1}^p - z_{i+1}^p y_i^p) + \frac{1}{2}(z_{NP}^p y_1^p - z_1^p y_{NP}^p), \quad (25)$$

$$z_{CG}^{p,zy} = \frac{1}{6A^{p,zy}} \left(\sum_{i=1}^{NP-1}(z_i^p + z_{i+1}^p)(z_i^p y_{i+1}^p - z_{i+1}^p y_i^p) + (z_{NP}^p + z_1^p)(z_{NP}^p y_1^p - z_1^p y_{NP}^p)\right), \quad (26)$$

$$r_{ellipsoid}^p = \left((r_{CG,polygon}^{p,2D})^T \quad \frac{(z_{CG}^{p,zx} + z_{CG}^{p,zy})}{2}\right)^T \quad (27)$$

Here $A^{p,zx}$ and $z_{CG}^{p,zx}$ are the area and center of gravity computed in the z and x coordinates, while $A^{p,zy}$ and $z_{CG}^{p,zy}$ are the area and center of gravity computed in the z- and y-coordinates. $r_{ellipsoid}^p$ is the center point of the ellipsoid.

Concerning the vertical axis, it is first noted that the purpose is to capture altitude variations caused by geography. This means that it is the systematic altitude variation between corners that matters, and that the probability mass is close to the 3D polygon surface.

Since it is geometrically obvious that the maximum and minimum altitude of a 3D-polygon surface occurs in one of the corners, it follows from the discussion above that a useful estimate of c is $$c = \frac{1}{2}(C_{ellipsoid}^{p,3D})^{\frac{1}{3}}\left(\max_i(z_i^p) - \min_i(z_i^p)\right). \quad (28)$$

As mentioned above, LTE supports provision of altitude data by both A-GPS and OTDOA. This opens up new possibilities due to that the fingerprinting technique can be based on more data and data achieved in new areas. It is thus a specific embodiment if the adaptive enhanced cell ID fingerprinting is based on at least one of A-GPS measurements and OTDOA measurements, preferably both. This makes the approach very suitable to be applied in wireless communication system operating according to LTE. However, these new data also require new considerations to be taken during the processes. As also mentioned above, it can be expected that OTDOA altitudes have a significantly larger uncertainty than A-GPS altitudes, a fact that was not accounted for when the altitude of the corners of the AECID polygons are computed with prior art technology.

When calculating the polygons in three dimensions, one possible approach is to first calculate a two-dimensional polygon according to principles known in prior art and then to add the altitude of the polygon corners. In other words, the provision of positioning data in a three-dimensional polygon format may in one embodiment comprise determining of lateral coordinates of the corner points from lateral coordinates of clustered position measurements. Examples of how this can be performed may be found in e.g. WO 2008/118052 A1. A respective altitude of each of the corner points is calculated as a weighted average of altitudes of a selected number of position measurements of a cluster around respective corner point. The weighted average is weighted according to an accuracy of each selected position measurement. This means in LTE that measurements based on A-GPS typically has another weight than measurements based on OTDOA.

Thus, an advantageous feature is the augmentation of the basic cell ID positioning method, with altitude information in an appropriate manner.

Somewhat more in detail, with a 2D polygon computed, measured altitude information of the clustered measurement points $r_j^{m,p}$ can now be used to augment each polygon corner with an altitude. The measured altitude information consists typically of an altitude and an altitude uncertainty. In embodiments according to LTE, this is a part of A-GPS and OTDOA reports. The vertical uncertainty is there considered as a part of the so called ellipsoid point with altitude and uncertainty ellipsoid format of, which is mostly used for A-GPS reporting. The uncertainty is decoupled from the horizontal information in the aforementioned format.

The uncertainty of the altitude measurement is written as:

$$z_j^{m,p} = z_{j,0}^{m,p} + \Delta z_j^{m,p} \quad (29)$$

$$(\sigma_j^{m,p})^2 = \langle(\Delta z_j^{m,p})^2\rangle \quad (30)$$

where $\langle\rangle$ denotes the uncertainty estimate performed by the position calculation node of the specific positioning method. It is important to note that the uncertainty estimates in altitude vary significantly between the measurements, between terminals, and as mentioned above in particular between A-GPS and OTDOA.

To augment each 2D polygon corner with an altitude, a horizontal search is performed to determine the set of points that are closest to each corner. In one embodiment, a pre-specified fraction of the total number of points in the cluster may e.g. be allocated to each corner for altitude computation. In other words, the selected number of clustered position measurements for determining the corner altitude is a pre-specified fraction of the total number of position measurements of the cluster that is situated closest to each respective corner point.

Denoting the closest measurements of the corner i with the subscript j(i), the best linear unbiased estimate (BLUE) for the altitude of each corner is given by:

$$z_i^p = \left(\sum_{j(i)=1}^{J_i^p} \frac{1}{(\sigma_{j(i)}^{m,p})^2}\right)^{-1} \sum_{j(i)=1}^{J_i^p} \frac{1}{(\sigma_{j(i)}^{m,p})^2} z_{j(i)}^{m,p}. \quad (31)$$

In another embodiment, the distribution of points can instead be used. To this end, the selected number of clustered position measurements is the number of position measurements within a pre-specified fraction of the total polygon area around each respective corner point.

Note that the measurements have weights according to their accuracy. This thus allows for a combined use of altitude information from A-GPS and OTDOA.

Figure 10:
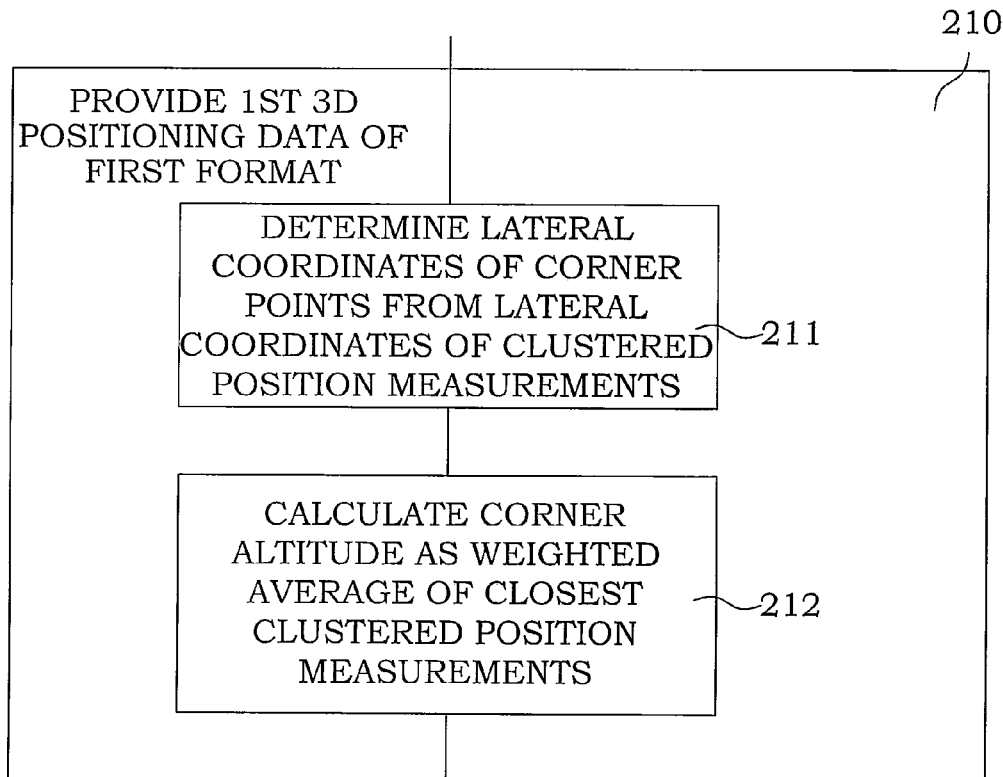
FIG. 10 is a flow diagram of an embodiment of a positioning data providing step of a method for positioning reporting.

FIG. 10 illustrates a flow diagram of an embodiment of a positioning data providing step 210 of a method for positioning reporting. In step 211, lateral coordinates of the corner points are determining from lateral coordinates of clustered position measurements. This is preferably performed according to previously known principles. In step 212, a respective altitude of each of the corner points is calculated as a weighted average of altitudes of a selected number of position measurements of a cluster around respective the corner points. The weighted average being weighted according to an accuracy of each selected position measurement.

Such treatment of altitude thus provides a corner altitude computation that optimally reflects the very different estimated variances of the altitude information obtained with A-GPS and OTDOA positioning. This is important for accuracy and it is not a part of prior art approaches. Such treatment, together with the use of the point with uncertainty cylinder also exploits a 3-dimensional (3D) uniform distribution for the (prior) terminal location, thereby adapting the new shape conversion to fingerprinting positioning in an advantageous manner, in particular in suburban and rural regions.

When having obtained positioning information in a format of a polygon with altitude, such information must be possible to spread through the communication system. A straightforward solution would be to change the standard formats to include also such format. However, changes in standards take time to perform and to be implemented in all networks. Furthermore, a format of a polygon with altitude involves a large number of parameters, which in turn requires relative large signaling resources.

According to the teachings of the present disclosure, another format—a point with an uncertainty elliptic cylinder—can be used instead, which with a less number of parameters in most cases provides a good approximation of the polygon with altitude. However, the present standard formats do not directly support such format.

The 3GPP ellipsoid point with altitude and uncertainty ellipsoid is still an available alternative for reporting altitude within the present standard LTE. Since the applied positioning method can be reported to the end user in LTE as a 'Position Data' information element, it is possible to make a different interpretation of the reported altitude uncertainty c than the intended one. This new interpretation is the maximum altitude variation of the 3D-polygon surface—rather than a vertical random uncertainty. In other words, the altitude uncertainty c becomes the height of the uncertainty cylinder. The 3GPP ellipsoid point with altitude and uncertainty ellipsoid format is thus used to transmit the parameters, while the 'Position Data' information element defines that the height parameter should be defined differently. In other words, the reporting is performed using a signaling format defining a point with an uncertainty ellipsoid and ellipsoidal height uncertainty and an additional information field instructing a receiving party to interpret the ellipsoidal height according to the signaling format as a height of the elliptic cylinder. This idea introduces a reporting of AECID position results with altitude, over the LTE interfaces, using the 'Position Data' information element, together with the 'ellipsoid point with altitude and uncertainty ellipsoid' format. Note in particular that the use of a combination of 'Position Data' and 'ellipsoid point with altitude and uncertainty ellipsoid' allows the resulting format to be interpreted as an 'point with uncertainty cylinder'.

More in detail, in 3GPP release 5, the 'Position Data' information element container was introduced in the LOCATION REPORT message. This functionality was later inherited by the LTE standard. Basically, the 'Position Data' information element container, allows reporting of which positioning method(s) that have been applied in the eSMLC in order to arrive at the reported terminal position. The information element includes a number of reserved methods, like cell ID and A-GPS, as well as network specific positioning methods, like fingerprinting and AECID.

'Position Data' is built up from two IEs. The first IE is the 'Positioning Data Discriminator' IE whereas the second one is the 'Position Data Set' IE. The latter IE is the important one for the present invention. The 'Position Data Set' IE is a list of octets (8 bit entities), where bits 4-8 indicate one of the positioning methods applied in order to obtain the reported positioning result, encoded in the 'Geographical Area' IE. The first 3 bits of each octet is reserved for other information (e.g. success/failure is indicated). The bits 4-8 are to be interpreted as follows:

Coding of positioning method (bits 8-4):
00000 Reserved
00001 Reserved
00010 Reserved
00011 Reserved
00100 Reserved
00101 Mobile Assisted GPS
00110 Mobile Based GPS
00111 Conventional GPS
01000 U-TDOA
01001 OTDOA
01010 IPDL
01011 RTT
01100 Cell ID
01101 to 01111 reserved for other location technologies
10000 to 11111 reserved for network specific positioning methods.

The additional information carried by the 'Position Data' information element is a key pre-requisite for specific embodiments of the present invention, which exploits said information to extend the interpretation of the 'ellipsoid point with altitude and uncertainty ellipsoid', to an 'ellipsoid point with altitude and uncertainty cylinder'.

The present embodiment is based on an introduction of a further format interpretation, such that when 'ellipsoid point with altitude and uncertainty ellipsoid' is used together with 'Position Data', indicating that 'fingerprinting/AECID' has been used to arrive at the result, enforces the reported geographical format to be interpreted as a 'point with uncertainty cylinder'. Similarly, when 'ellipsoid point with altitude and uncertainty ellipsoid' is used together with 'Position Data', indicating that CID has been used to arrive at the result, the reported geographical format should be interpreted as a 'point with uncertainty cylinder'.

An alternative to the new interpretation of the combination of 'Position Data' and 'ellipsoid point with altitude and uncertainty ellipsoid' is to introduce a new position reporting format, tentatively denoted 'point with uncertainty cylinder'. In other words, the reporting is performed using a signaling format defining an elliptic cylinder having a centre point and an associated confidence value. The encoding can in a basic version be similar as the 'ellipsoid point with altitude and uncertainty ellipsoid', however more general embodiments are disclosed further below.

As described above, the point with an uncertainty elliptic cylinder works well in the most cases for approximating the three-dimensional polygon. An even better utilization of that format would be possible if further degrees of freedom would be allowed. For instance, if the cell covers an area that has a general slope, e.g. a mountain side, the height of the cylinder would be in the same order of magnitude as the largest difference in height between two spots within the cell. However, at each lateral position, the height uncertainty is not that bad and the elliptic cylinder therefore gives an unnecessarily imprecise position. The situation would be considerably different if it would be possible to define the base plane of the cylinder to be essentially parallel to the mountain slope. To that end, it is proposed to add two further parameters to define the point with uncertainty elliptic cylinder, namely a tilting of the cylinder axis with respect to the vertical, as defined by two additional angles $\omega$ and $\xi$. The above presented procedures are easily modified to handle also such additional parameters. In one embodiment, the transforming of the polygon positioning data into positioning data of this new format comprises the finding of a tilted plane, tilted with respect to a horizontal plane. The tilted plane follows the corner points of the three-dimensional polygon better, according to a predetermined criterion, than any horizontal plane. This may e.g. be an average slope of the above discussed mountain side. A plane parallel to this tilted plane is then used as the base plane in the transformation into the cylinder format. The points then have to be coordinate transformed into a coordinate system based on the tilted plane.

The direction of a tilted plane can be defined by two angles in different ways. One possibility would be to define to angles between a normal of the tilted plane and a vertical line in certain directions. Theses angles can be defined e.g. in the same directions as the semi-major and semi-minor axes of the ellipse. Another possibility would be to define the angles in directions fixed to the earth coordinate system, e.g. one in the north-south direction and the other in the west-east direction. A third possibility would be to find the smallest angle between normal of the tilted plane and a vertical line and to define the associated direction with respect to e.g. the north direction. Anyone skilled in the art realizes that there are many other possibilities for defining a tilted plane with two additional parameters.

Since the exact definition may become subject to standardization, it is not possible to give all details of a final solution. One of the possible embodiments is described here below as an example. In the present case, a tilting of the computed 2D ellipse is performed, to fall in the mean 3D plane of the polygon with altitude. The distance with sign, of all corners points, to said mean plane are then used in (28), to compute a modified and much smaller uncertainty c.

The first step of the further transformation would be to compute the mean plane of the polygon with altitude. Noting that since the equation of a plane in 3D is $$ax+by+cz+d=0, \tag{32}$$

and that the normal vector to the plane is $(a\ b\ c)^T$, it follows that angles with respect to the vertical and any other reference direction, can be computed once $(a\ b\ c)^T$ is determined. This angular computation is standard and can e.g. be performed using scalar products. It hence remains to determine a, b, c (and d). Noting that (32) can be written $$(x\ y\ z\ 1)\begin{pmatrix}a\\b\\c\\d\end{pmatrix}=0, \tag{33}$$

It follows that the vector $(a\ b\ c)^T$ can be estimated using the following least squares problem $$(\hat{a}\ \hat{b}\ \hat{c}\ \hat{d})=\min E^T E \tag{34}$$

$$E=\begin{pmatrix}x_1^p & y_1^p & z_1^p & 1\\ \vdots & \vdots & \vdots & \vdots \\ x_{N^P}^p & y_{N^P}^p & z_{N^P}^p & 1\end{pmatrix}\begin{pmatrix}a\\b\\c\\d\end{pmatrix}. \tag{35}$$

Given the normal $(a\ b\ c)^T$, the transformed distance of each corner from the plane can also be computed with standard formulas, resulting in $z_i^{p,tilted}$, $i=1, \ldots, N^P$. The vertical uncertainty replacing (28) finally becomes $$c=\frac{1}{2}\left(C_{ellipsoid}^{P,3D}\right)^{\frac{1}{3}}\left(\max_i\left(z_i^{p,tilted}\right)-\min_i\left(z_i^{p,tilted}\right)\right). \tag{36}$$

Figure 11:
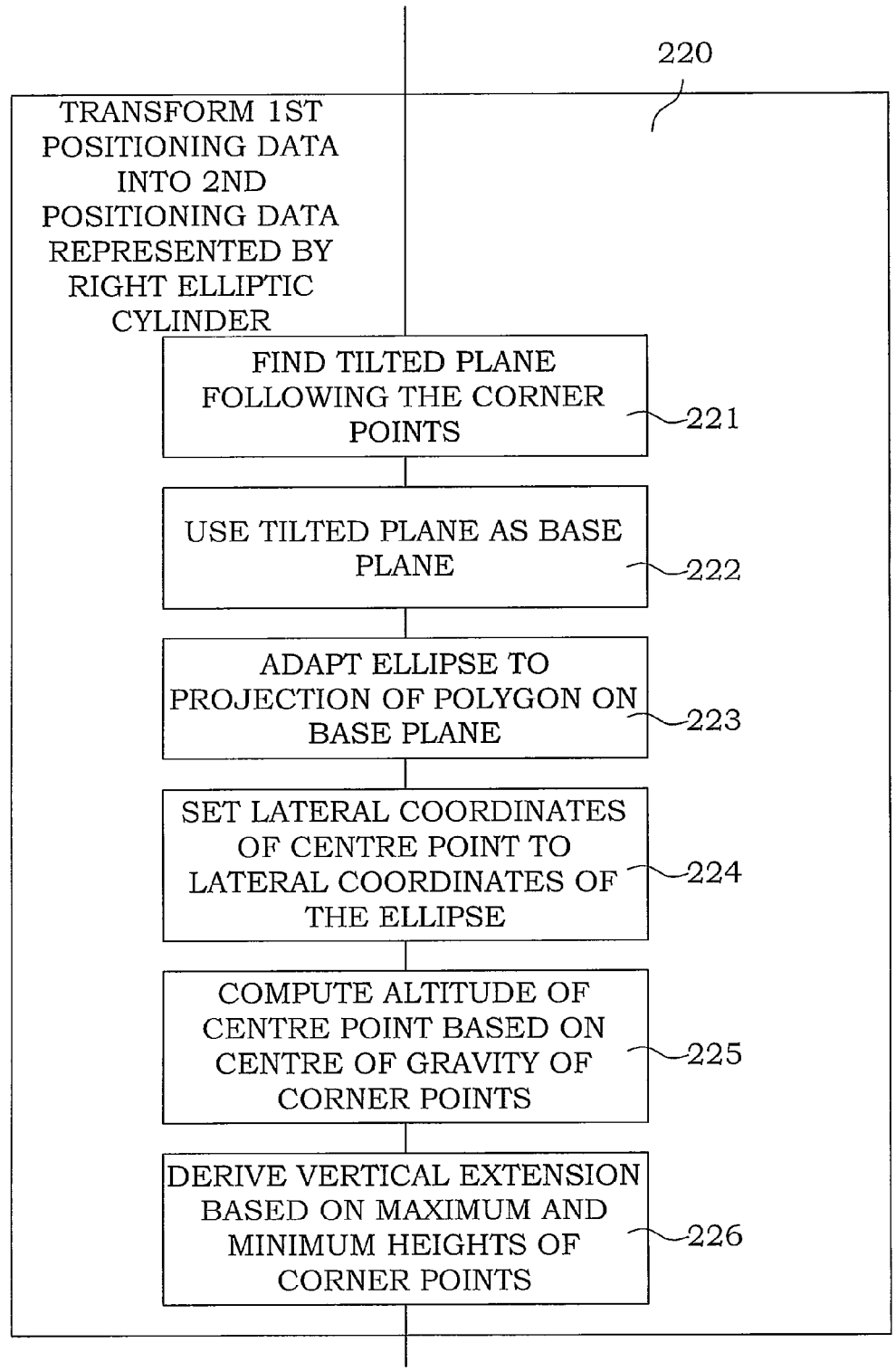
FIG. 11 is a flow diagram of another embodiment of a transforming step of a method for positioning reporting.

FIG. 11 illustrates a flow diagram of an embodiment of a transforming step 220 of a method for positioning reporting. In step 221, a tilted plane, tilted with respect to a horizontal plane, is found. The tilted plane follows the corner points better, according to a predetermined criterion, than any horizontal plane. In step 222, a plane parallel to the tilted plane is used as the base plane. Steps 223-226 are the same as in FIG. 7.

Figure 12:
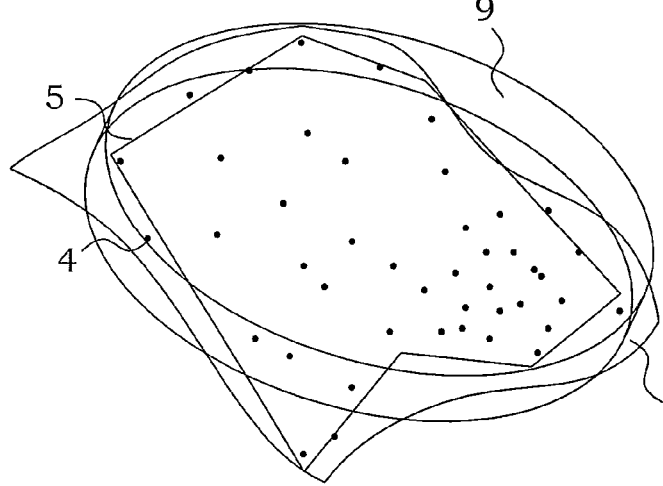
FIG. 12 is a schematic drawing of approximations of a three-dimensional polygon with a tilted elliptic cylinder.

The use of a tilted elliptic cylinder can represent the three-dimensional polygon of e.g. a generally sloped plane in a very efficient way. This is easily seen in FIG. 12.

If a new format 'point with uncertainty cylinder' is to be standardized, this format would then preferably contain the same quantities as discussed further above plus two additional angles, angle $\omega$ and angle $\xi$. The two angles define the tilting of the tilted plane.

The present invention provides means and processes for refined accuracy of the AECID positioning method by enabling the provision of altitude and altitude uncertainty to an end user. A very important special case of this is the back-bone cell ID method, which can also be augmented with altitude information using the above disclosed technologies. The invention is believed to be important e.g. for E-911 positioning in tall buildings in metropolitan regions, with 3D cell planning. It is also believed to be a useful technology in mountainous regions, e.g. for outdoor recreational purposes for users without A-GPS capable cell phones. A special feature of the invention is that it is based on the correct statistical model of the prior user location, contrary to prior art, which statistical model builds on an approximation. The importance of altitude functionality for fingerprinting positioning is evidenced by market demands.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

ABBREVIATIONS

3GPP—3rd Generation Partnership Project
AECID—Adaptive Enhanced Cell-ID
A-GPS—Assisted Global Positioning System
AoA—Angle of arrival BSC—Base Station Controller
BLUE—Best Linear Unbiased Estimate
CID—Cell ID
CN—Core Network
eNB—Extended Node B
eSMLC—Enhanced Serving Mobile Location Center
E-UTRAN—Evolved Universal Terrestrial Radio Access Network
GSM—Global System for Mobile communications
IE—Information Element
LTE—Long-Term Evolution
OTDOA—Observed Time Difference Of Arrival
RBS—Radio Base Station
RNC—Radio Network Controller
RSS—Received Signal Strength
RTT—Round Trip Time
SMLC—Serving Mobile Location Center
TA—Timing advance
UE—User Equipment
WCDMA—Wideband Code Division Multiple Access

REFERENCES

[1] T. Wigren, Adaptive enhanced cell-ID fingerprinting localization by clustering of precise position measurements, IEEE Trans. Veh. Tech., vol. 56, pp. 3199-3209, 2007.
[2] WO 2008/054271.
[3] WO2008/118052.
[4] T. Wigren and J. Wennervirta, "RTT Positioning in WCDMA", in Proceedings of the 5th International Conference on Wireless and Mobile Communications, ICWMC 2009, Cannes/La Bocca, France, pp. 303-308, Aug. 23-29, 2009.
[5] WO 2010/069614.

The invention claimed is:

1. A method, performed in a positioning node of a wireless communication system, for positioning reporting in said wireless communication system, the method comprising:
    providing first positioning data of a first format in three dimensions, said first format representing a polygon with corner points, said corner points having coordinates in three dimensions;
    transforming said first positioning data into second positioning data of a second format, said second format representing said first positioning data as a representation of an elliptic cylinder being centered around a center point and having an elliptic base in a base plane; and
    reporting said second positioning data over an interface of said wireless communication system.

2. The method of claim 1, wherein said transforming comprises:
    adapting center lateral coordinates and major axis, minor axis and orientation of an ellipse to a projection of said polygon to said base plane defining said elliptic base;
    setting lateral coordinates, with respect to said base plane, of said center point to be equal to said center lateral coordinates, with respect to said base plane, of said elliptic base;
    computing an altitude of said center point along a normal to said base plane, based on center of gravity properties of said corner points;
    deriving a vertical extension of said elliptic cylinder on each side of said center point along said normal to said base plane, based on maximum and minimum heights of said corner points relative to said base plane.

3. The method of claim 2, wherein said computing of said position of said center point is performed by determining two two-dimensional center of gravities of the polygon corners in respective perpendicular planes being parallel to the direction of said normal of said base plane, and by setting said position of said center point along said normal to said base plane as an average of said two two-dimensional centers of gravity.

4. The method of claim 2, wherein said computing of said position of said center point is performed by determining an altitude along said normal to said base plane of a three-dimensional center of gravity of the polygon corners.

5. The method of claim 2, wherein said deriving of a vertical extension of said elliptic cylinder on each side of said center point along said normal to said base plane comprises computing half the difference between said maximum and minimum heights of said corner points relative to said base plane times a factor representing a confidence value of said position in three dimensions.

6. The method of claim 1, wherein said first format represents positioning data achieved by adaptive enhanced cell ID fingerprinting.

7. The method of claim 6, wherein said adaptive enhanced cell ID fingerprinting is based on at least one of Assisted Global Positioning System (AGPS) measurements and Observed Time Difference Of Arrival (OTDOA) measurements.

8. The method of claim 6, wherein said wireless communication system operates according to Long-Term Evolution (LTE).

9. The method of claim 6, wherein said providing first positioning data comprises:
    determining lateral coordinates of said corner points from lateral coordinates of clustered position measurements; and
    calculating a respective altitude of each of said corner points as a weighted average of altitudes of a selected number of position measurements of a cluster around respective said corner points, said weighted average being weighted according to an accuracy of each selected position measurement.

10. The method of claim 9, wherein said selected number of clustered position measurements is a pre-specified fraction of the total number of position measurements of said cluster being situated closest to each respective corner point.

11. The method of claim 9, wherein said selected number of clustered position measurements is the number of position measurements within a pre-specified fraction of the total polygon area around each respective corner point.

12. The method of claim 1, wherein said reporting is performed using a signaling format defining an elliptic cylinder and an associated confidence value.

13. The method of claim 12, wherein said transforming said first positioning data into second positioning data of a second format comprises:
    finding a tilted plane, tilted with respect to a horizontal plane, which tilted plane follows said corner points better, according to a predetermined criterion, than any horizontal plane; and
    using a plane parallel to said tilted plane as said base plane.

14. The method of claim 13, wherein said signaling format further defines two angles defining said tilting of said tilted plane.

15. The method of claim 1, wherein said step of reporting is performed using a signaling format defining a point with an uncertainty ellipsoid and ellipsoidal height uncertainty and an additional information field instructing a receiving party to interpret the ellipsoidal height according to said signaling format as a height of said elliptic cylinder.

16. A positioning node for use in a wireless communication system, the positioning node comprising:
- an adaptive enhanced cell ID fingerprinting device;
- a report converter connected to or incorporated into said adaptive enhanced cell ID fingerprinting device and configured to receive first positioning data achieved by adaptive enhanced cell ID fingerprinting of a first format in three dimensions, said first format representing a polygon with corner points having coordinates in three dimensions, said report converter being further configured to transform said first positioning data into second positioning data of a second format, said second format representing said first positioning data as a representation of an elliptic cylinder being centered around a center point and having an elliptic base in a base plane;
- a report unit connected to said report converter and configured to report said second positioning data over an interface of said wireless communication system.

17. The positioning node of claim 16, wherein said wireless communication system is a Long-Term Evolution (LTE) system.

* * * * *